Oct. 8, 1968　　　　H. H. STILLEY ETAL　　　　3,405,296
TAKE-UP REEL FOR ROTATABLE STATOR LEADS
Filed Sept. 24, 1965　　　　　　　　　　　　2 Sheets-Sheet 1

INVENTORS.
HERSCHEL H. STILLEY
KENNETH S. KORDIK
BY
Wolfe, Hubbard, Voit & Osann
ATTORNEYS.

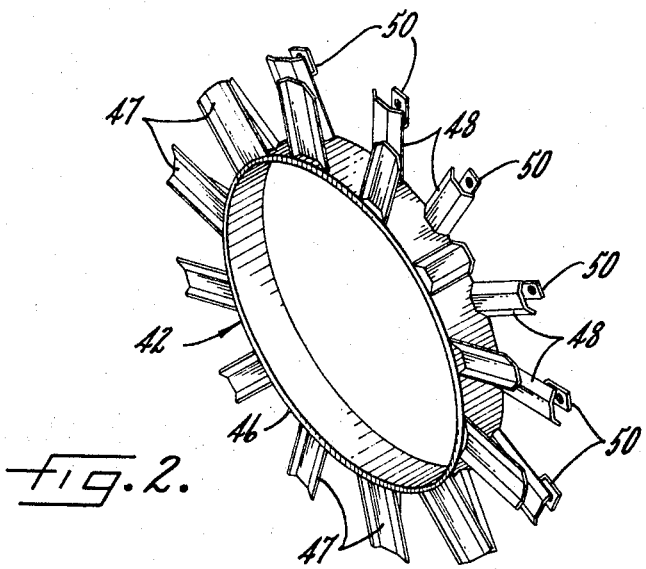
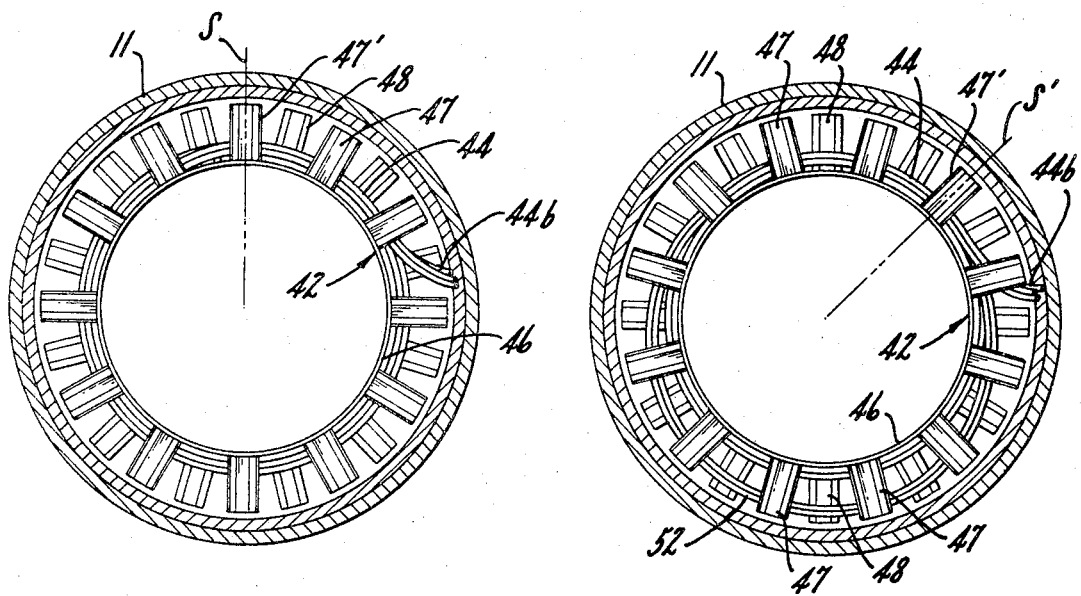

United States Patent Office 3,405,296
Patented Oct. 8, 1968

3,405,296
TAKE-UP REEL FOR ROTATABLE STATOR LEADS
Herschel H. Stilley and Kenneth S. Kordik, Rockton, Ill., assignors, by direct and mesne assignments, of one-half to Warner Electric Brake & Clutch Company, South Beloit, Ill., and one-half to said Stilley
Filed Sept. 24, 1965, Ser. No. 489,832
5 Claims. (Cl. 310—116)

ABSTRACT OF THE DISCLOSURE

A motor having at least one rotatably adjustable stator for controlling the speed and torque characteristics thereof. The said motor utilizes an apparatus which comprises a reel structure for carrying the motor stator leads thereby preventing the motor stator leads from obstructing any of the moving parts within the motor housing.

---

The present invention relates generally to A-C motors of the type which employ adjustable stators for controlling the speed and torque characteristics thereof and more particularly to apparatus for carrying the motor stator leads characterized by its ability to enable rotation of a stator yet wherein the leads are neither contained exterior of the motor nor obstruct any of the moving parts within the motor housing.

An A-C motor of the type that may be advantageously utilized with the apparatus of the present invention is described and claimed in the copending application of Charles C. Roe, Ser. No. 207,886, filed July 6, 1962 and assigned to the assignee of the present invention. There is disclosed and claimed in the aforesaid Roe application an A-C motor wherein a pair of stators are made rotatable with respect to a single rotor. The stators are interconnected by a differential linkage which has its neutral point anchored with respect to the motor frame so that the two stators are constrained to move equally and in opposite directions from a null phase position in which the voltages induced by the stators in the rotor winding are oppositely phased and cancel one another. Alternatively, the stators may be adjusted to positions in which the induced voltages are additive for production of maximum torque. Since the stators must be given sufficient freedom of rotation to enable relative positioning thereof between the null phase relation and the maximum torque position, slack must be provided in the leads of the stators. Such slack must be either stored exterior of the housing and appropriately fed to the stators when rotated or it must be left within the housing itself. Simply leaving the slack within the housing can result in entanglement of the leads or interference with the rotating parts of the motor.

Accordingly, it is a general aim of the present invention to provide an apparatus which overcomes the foregoing disadvantages and which is characterized by its ability to permit rotation of the stator without having bulky external storage arrangements or interference with internally rotating motor parts.

Another object of the present invention is to provide an apparatus for carrying and feeding leads to a rotatable stator which is not only simpler and lower in cost, but which avoids common sources of trouble such as springs or other mechanical winding apparatus.

It is still another object to provide a stator lead feeding apparatus which is operated by rotation of the stator itself and may be employed within the confines of the space available within the motor housing.

It is a more specific object of the invention to provide a rotatable stator lead take-up device which may be inexpensively constructed utilizing noncritical and readily fabricated components and which may be conveniently and easily accomplished on existing standard machines.

Other objects and advantages of the invention will become apparent upon reading the following detailed discussion and upon reference to the attached drawings, in which:

FIG. 2 is a perspective of a single rotatable reel;

FIG. 3 is an axial section of the reel and housing taken along the lines 3—3 of FIG. 1, showing the stator leads wound thereon; and FIG. 4 is a view similar to FIG. 3 but here depicting the stator and reel after rotation in a clockwise direction.

Figure 1:
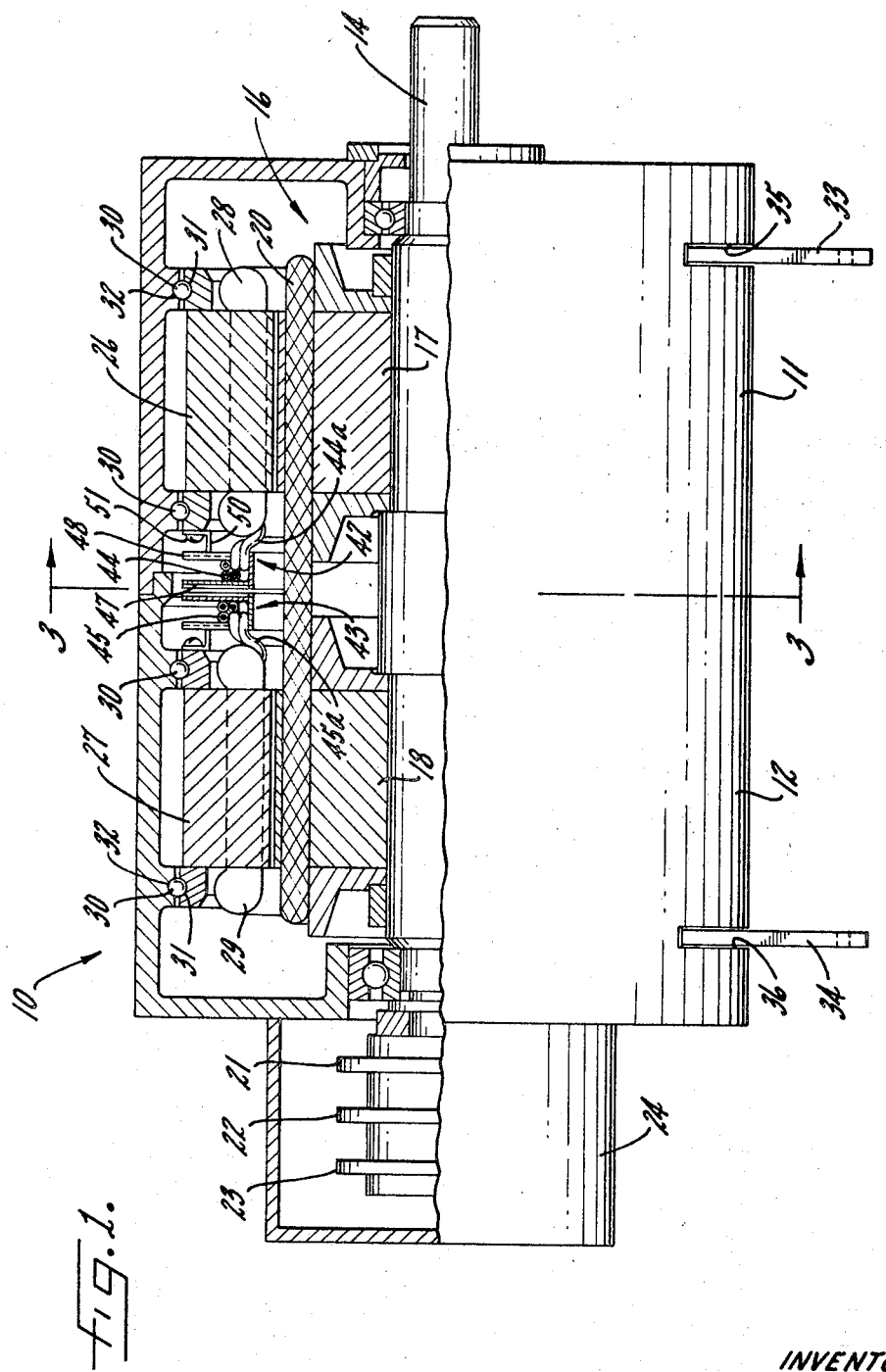
FIGURE 1 is an elevation partially in section of a exemplary stator reel constructed according to the invention and installed in a motor.

While the invention will be described in connection with a certain preferred embodiment, it will be understood that we do not intend to limit the invention to that described. On the contrary, we intend to cover all alternatives, modifications and equivalents as may be included within the spirit and scope of the invention as defined by the appended claims.

Referring now to the drawings and particularly to FIG. 1 there is illustrated an A-C motor of the type employing a pair of rotatable stators cooperating with a single rotor assembly with the stators being angularly adjustable relative to one another to adjust the physical phase positioning and to vary the motor output characteristics. The motor, generally indicated at 10, consists of a pair of cup-shaped members 11, 12 connected together to define a cylindrical housing. Extending axially through the housing is a rotor shaft 14 suitably journalled therein and having secured thereto a rotor assembly, indicated generally at 16, which in the present instance includes two portions 17, 18. Engaging both portions of the rotor is a winding 20, preferably of the "wound" type which is brought out to slip rings 21–23, inclusive. A cup-shaped closure member 24 secured to the left-hand housing member 12, as viewed in FIG. 1, is provided to enclose the slip rings.

Spaced side by side in the frame and alined with the portions 17, 18 of the rotor are stator assemblies 26, 27 having winding 28, 29 respectively so that the rotating magnetic field generated by the stator assemblies induces current in their respective rotor portions, creating a secondary rotor field producing rotation and torque of the motor. The stator windings are preferably three phase windings which may either be lap wound or wave wound having connections (not shown) for connection to the regular three phase supply line. Each of the stator assemblies is rockably supported within the housing 10 and are supported by suitable bearings, which in the present instance includes balls 30 which ride in an annular grooved member 31 secured to the stators and groove 32 formed on the inside of the housing members 11, 12.

The speed and torque characteristics of the present motor are changed by rocking the stators via a pair of arms 33, 34 extending outwardly through slots 35, 36 provided in the motor housing. For more details as to a control mechanism suitable for use with a motor of the type described, reference is made to the aforesaid copending application Ser. No. 207,886. For the purpose of the present application suffice it to say that the stators may be rotatably oriented with respect to one another to produce a null phase position, or to a position in which the induced voltages are additive for the production of maximum torque, and, of course, the stators can be adjusted for any of an infinite member of resultant voltages between the maximum and null phase positions.

In accordance with the present invention, means are provided coaxially secured to each of the stators for rotation therewith and adapted to carry coils of wire connectable with the stator leads to permit the stators to be rotated without interference from the stator power supply leads. To this end, referring to FIG. 1, reels 42, 43 secured to stators 26, 27 respectively carrying wire coils 44, 45 with respective ones of its ends 44a, 45a attached to the leads of stator windings 28, 29 respectively and the other ends 44b, 45b connected to a suitable junction box or the like (not shown) exterior of the motor housing adapted to be connected to a source of power.

Turning to FIG. 2, for the sake of convenience, only reel 42 is shown, however, it will be understood as the discussion proceeds that the structure of reel 43 will be the same in all essential respects. The reel 42 is formed of a generally cylindrical shell 46 having arms or spoke members 47, 48 secured to the opposite ends of the shell in a spaced radially extending manner.

The spokes 47 are staggered with respect to the spokes 48 and the latter are provided with generally L-shaped fastening members 50 for securing the reel to the stator by suitable threaded fasteners 51 or the like. The stator leads are connected respectively to the ends 44a of coil 44, which is looped about the shell 46 of reel 42 and the other ends 44b of cails 44 are held fixed relative to the motor housing. In the present instance, each of the coils is wound around the reel twice, however the number of turns can be varied within practical limitations. The lengths of the spokes also, are determined by the size of the motor housing, the size and number of the wires and the number of turns on the coils. As a further example of an A-C motor of the type with which the present invention may be utilized, but which includes six stator leads due to the fact that the number of stator poles may be switched for high and low speed operation, reference is made to our copending application Ser. No. 458,626, filed May 25, 1965.

In order to more fully understand the operation of the reels, reference is made to FIG. 3 where the reel 42 is shown in the extreme counterclockwise position of the stator 26. The reel 42 appears as shown in FIG. 3 with the spoke 47' being in an upright position S and the coil closely wound about the shell surface. When the stator 26 is rotated clockwise by some angle 45°, for example, it carries the reel 42 with it, and spoke 47' assumes the position S' creating slack in the coils 44 so that the coil wires "belly" out as shown at 52 in FIG. 4, while staying within the confines of two rows of spokes 47, 48. Because of the "bellying" out of the leads, the ends 44b of the coils fixed relative to the motor and stator respectively are not disturbed and there is no interference within the motor with any moving parts. When the reel is rotated back to the position S of FIG. 3, the initial tension applied to the coils wrapped around the reel is not changed. Thus, compact storage within the housing 10 of the motor, and rotation without entanglement or breakage of the leads, is obtained.

Although the reels are shown as used with two movable stators, it is to be understood that where only one stator moves relative to the other the present invention is also entirely applicable. Thus, the present invention is intended to function in the above-described fashion when it is used in a motor having one fixed and one rotatable stator.

The components of the reel may be fabricated from sheet steel or other sheet material with the spokes and L-shaped fastening members simply welded or otherwise secured to the shell.

We claim as our invention:

1. Lead carrying apparatus for an A-C motor having a housing and at least one rotatably adjustable stator presenting winding leads, comprising in combination, a reel adapted to be coaxially secured to said stator for rotatable adjustment therewith and means defining coils wound about said reel with the opposite ends of said coils connected to said stator windings and fixed to said housing respectively so that when said stator and reel are rotatably adjusted said coils belly out radially within the confines of said reel.

2. Lead carrying apparatus for an A-C motor having a housing and at least one rotatably adjustable stator presenting winding leads, comprising, in combination a generally cylindrical shell, means defining a plurality of radially extending spokes secured to opposite ends of said shell, means for coaxially attaching said shell to said rotatably adjustable stator for movement therewith and means defining coils wound about said shell with the opposite respective ends thereof connected to said stator windings and fixed to said housing so that when said stator and shell are rotatably adjusted slack formed in said coils is confined between said spokes.

3. The combination with an A-C motor having a housing, first and second stator assemblies in said housing having substantially identical windings for producing rotating fields, a rotor in said housing having windings in which voltages are induced by the stator fields, at least one of said stators being rotatably movable between a null phase relation in which induced voltages are cancelled and an alined phase relation in which the induced voltages are additive, of stator lead carrying apparatus comprising a generally cylindrical shell, radially extending members peripherally secured to opposite ends of said shell, means for securing said shell to said rotatably movable stator for rotation therewith, means defining lead coils wound about said shell with the opposite ends of the coils being connected to said rotatably movement stator winding and fixed to said housing, respectively, so that when said stator and shell are rotated in a first direction said coils belly out radially within the confines of said radially extending members and so that when said stator and shell are rotated in the opposite direction said coil is rewound about the shell.

4. A stator lead carrying apparatus as defined in claim 3 wherein said radially extending members comprise spokes staggered with respect to one another on the opposite ends of said shell.

5. A stator carrying apparatus as defined in claim 4 wherein said means for securing said shell to said stator comprises generally L-shaped members secured to the spokes at one end of said shell.

References Cited

UNITED STATES PATENTS 3,290,574  12/1966  Roe _____ 310—112

MILTON O. HIRSHFIELD, *Primary Examiner.*

G. NUNEZ, *Assistant Examiner.*